O. A. MYGATT.
ILLUMINATING APPLIANCE.
APPLICATION FILED DEC. 31, 1915.

1,282,617. Patented Oct. 22, 1918.

WITNESSES

INVENTOR
Otis A. Mygatt
BY
Joel B. Liberman
his ATTORNEYS

UNITED STATES PATENT OFFICE.

OTIS A. MYGATT, OF NEW YORK, N. Y., ASSIGNOR TO HOLOPHANE GLASS COMPANY, A CORPORATION OF NEW JERSEY.

ILLUMINATING APPLIANCE.

1,282,617.

Specification of Letters Patent.

Patented Oct. 22, 1918.

Application filed December 31, 1915. Serial No. 69,673.

*To all whom it may concern:*

Be it known that I, OTIS A. MYGATT, a citizen of the United States, and resident of the city and State of New York, have invented certain new and useful Improvements in Illuminating Appliances, of which the following is a specification.

The object of my invention is to produce a compound glass light-transmitting illuminating appliance for artificial light which will do away with a large part of the losses in illuminating efficiency due to absorption caused by the incident light rays being deviated by refraction back into the inclosure. My invention is especially useful for making compound prism glass lighting appliances where many of the rays are directed into downward directions as is the case in interior lighting, but it is also useful and efficient for lighting large areas such as streets and highways. The principle involved is one of paralleling of transmitting prisms.

Figure 1:
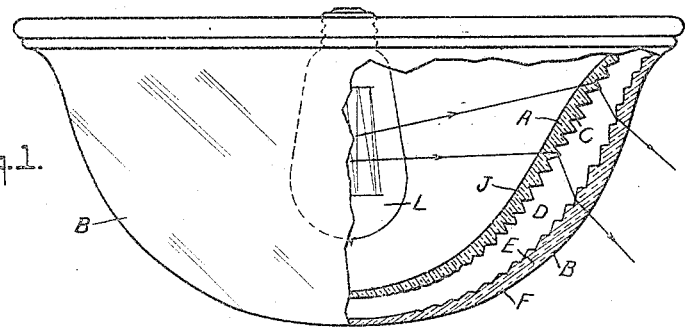
Figure 2:
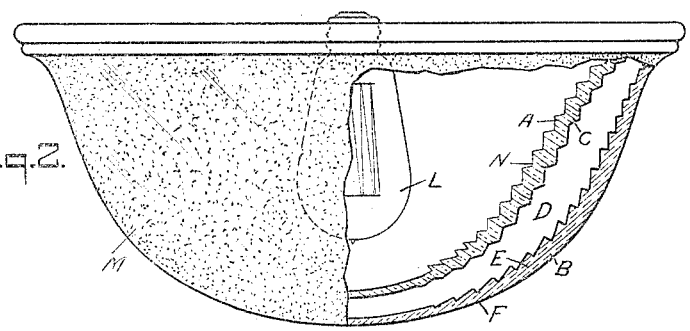
Figure 3:
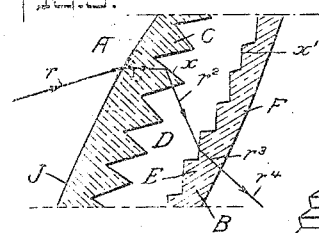
Figure 4:
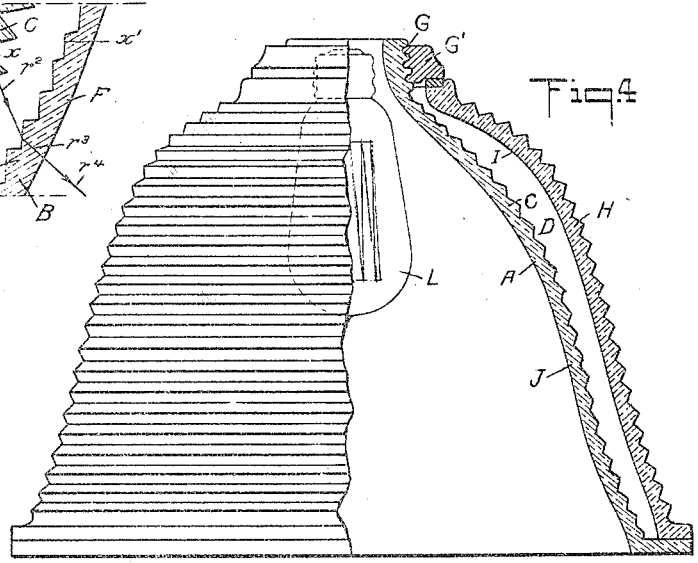

In the figures, some of the preferred forms have been shown. Figure 1 is a vertical plan view partly in cross-section of a globe embodying one form of my invention. Fig. 2 is a similar view of another form embodying my invention. Fig. 3 is a detail of Fig. 1 showing the path of light rays. Fig. 4 is a vertical plan view partly in cross-section of a shade embodying a further form of my invention.

In Fig. 1, the interior shade A is of glass, having a smooth interior J and generally horizontal external prisms C, constructed in the manner hereinafter explained. Intervening between this shade and the outer cover is an air-space D; the outer cover B is also of glass and has a smooth exterior F, and a generally horizontal prismatic inner surface E calculated as hereinafter set forth. The two shades are fastened together in the manner usual for globes.

In Fig. 2 a similar globe is shown wherein the prisms 1, on the outer cover, are of different construction.

In Fig. 3 a cross-section of a fragment of Fig. 1 showing on a large scale the method in which the loss of light is avoided through internal refraction with my appliance. The prisms and air-space are greatly exaggerated to illustrate more clearly the path of the light rays. A typical ray $r$ from the light source L strikes the inner smooth surface J, of the inner shade A, is deviated by the glass wall of the said shade in direction $r'$ to one side X of the prismatic corrugation; the ray is then deviated in the direction $r^2$ through the air-passage D, and to the outer glass shade and impinges on the face X' of one of the prisms where it is again deviated in the direction $r^3$ taking this course until it leaves the smooth surface F of the outer shade emerging in the direction $r^4$. Except for the presence of the prisms on the surface of the outer cover either as shown in Figs. 1, 2 or 4, the rays after they have left Fig. 1 would go back into the inner cover and be absorbed and lost. The faces of the horizontal ribs or prisms are arranged at angles which will permit a majority of the light rays, as deviated, to pass through the glass instead of being refracted back from the surface. One of the objections to compound globes and reflectors hitherto is that the rays which pass through compound glass surfaces are refracted back and forth within the glass surface and are largely absorbed and sent out in the undesirable directions. In the present invention the light rays do not strike the faces of the interior prisms within the so-called critical angle so as to be reflected back, but these rays pass through the body of the inner shell A and within the air-space to the outer cover reaching that surface at an angle less than 45 degrees and therefore pass through and out of the outer surface.

Where a higher illuminating efficiency from the rays of the inclosed light source is required, the form used in Fig. 4 is used; the outer surface of the outer cover is covered with horizontal prisms H, of the form shown, but where it is desirable to clean the device readily, some of the illuminating efficiency may be sacrificed and the outermost and innermost surface of the device can be smooth in the manner shown in Fig. 1. Where the cleaning is not important and where great diffusion is required, the inner surface of the inner cover and the outer surface of the outer cover of any of the modifications can be covered with diffusing ribs or sandblasted or acid-etched, as shown in M and N of Fig. 2. Where modifications of the general shape of Fig. 4 are used, a glass and metal thread arrangement G and G' is employed, as set forth in my application filed this day.

The general contours of the two glass inclosures should be preferably of such form as will enable the two articles when held together to form a compound article with the upper and lower edges in contact so as to prevent dirt and dust from entering between the outer and inner shells. It is to be understood that the paralleling of prisms on the outer and inner covers can be carried out in any direction and is not limited to the horizontal forms shown. It is not necessary that the interior surfaces of either shell should be entirely covered with horizontal ribs or prisms, as these are placed on such parts only as are necessary to prevent the refraction and consequent absorption of light rays heretofore explained.

Having described my invention what I claim is:—

1. A compound glass illuminating appliance having a light source, an outer cover, an inner cover and an intermediate air-space, the covers being fastened together and surrounding the light source, the covers being provided with prisms running in the same direction, such prisms being calculated so that a majority of the light rays directly incident from the light source are transmitted and deviated in downward directions.

2. A compound glass illuminating appliance consisting of a light source, an outer cover, an inner cover, and an intermediate air-space, the covers being fastened together and inclosing the light source, the outer cover being provided with prisms on its inner surface and the inner cover provided with prisms paralleling those on the outer surface, the prisms being calculated so that a majority of the light rays directly incident from the light source are transmitted and deviated in downward directions.

3. A compound glass illuminating appliance consisting of a light source, an outer cover, an inner cover and an intermediate air space, the covers surrounding the light source, the outer cover being smooth on its exterior and provided with prisms on its interior, the inner cover being provided with prisms paralleling those on the outer cover, the prisms being calculated so that a majority of the light rays directly incident from the light source are transmitted and deviated in downward directions.

4. A compound glass illuminating appliance consisting of a light source, an outer cover and an inner cover fastened together and inclosing the light source, with an intermediate air-space between the covers, the outer cover being smooth on its exterior and provided with prisms on its interior, the inner cover having prisms running parallel to those on the outer cover, such prisms being calculated so that a majority of the light rays directly incident from the light source are transmitted and deviated in downward directions.

5. A compound glass illuminating appliance having a light source, an outer cover, an inner cover and an intermediate air-space, the outer cover being smooth on its exterior and provided with horizontal prisms on its interior, the inner cover having horizontal prisms on one surface, the prisms being calculated so that a majority of the light rays are transmitted and deviated in downward directions.

6. A compound glass illuminating appliance having a light source, an outer cover, and an inner cover fastened together and an intermediate air-space, the outer cover being smooth on its exterior and provided with horizontal prisms on its interior, the inner cover having horizontal prisms on one surface, the prisms being calculated so that a majority of the light rays are transmitted and deviated in downward directions.

7. A compound glass illuminating appliance having a light source, an outer cover, an inner cover, fastened together, and an intermediate air-space, the outer cover being smooth on its exterior and provided with horizontal prisms on its inner surface, the prisms being calculated so that a majority of the light rays are transmitted and deviated in downward directions.

8. A compound glass illuminating appliance having a light source, an outer cover and an inner shell fastened together, and an intermediate air-space, the outer cover being provided with horizontal prisms on its inner surface and the inner shell provided with horizontal prisms on its outer surface, the prisms being calculated so that the majority of light rays are transmitted and deviated in downward directions.

9. A compound glass illuminating appliance having a light source, an outer cover and an inner shell fastened together, and an intermediate air-space, the outer cover being smooth on its exterior and provided with horizontal prisms on its interior, the inner shell being smooth on its interior and provided with horizontal prisms on its outer surface, the prisms being calculated so that a majority of the light rays are transmitted and deviated in downward directions.

10. A glass shade for an artificial light source comprising inner and outer pieces both having transverse prisms thereon, both of said pieces being so shaped and the prism faces so disposed that the angles of incidence of the light rays will be low.

OTIS A. MYGATT.

Witnesses:
 JOEL B. LIBERMAN,
 JOSEPH DUNN.